(12) United States Patent
Amarendra et al.

(10) Patent No.: US 11,363,168 B2
(45) Date of Patent: Jun. 14, 2022

(54) SECURING AUTHORIZED ACCESS OF A SCANNED IMAGE

(71) Applicant: Hewlett-Packard Development Company, L.P., Spring, TX (US)

(72) Inventors: Shakti Amarendra, Bangalore (IN); Balaji Yalamarthi, Bangalore (IN); Vasu Agrawal, Bangalore (IN); Sharanabasappa, Bangalore (IN); Anusha Ghali, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,972

(22) PCT Filed: Feb. 11, 2019

(86) PCT No.: PCT/US2019/017413
§ 371 (c)(1),
(2) Date: Jan. 5, 2021

(87) PCT Pub. No.: WO2020/091826
PCT Pub. Date: May 7, 2020

(65) Prior Publication Data
US 2021/0250466 A1 Aug. 12, 2021

(30) Foreign Application Priority Data
Nov. 1, 2018 (IN) .............................. 201841041453

(51) Int. Cl.
*H04N 1/44* (2006.01)
*G06F 21/60* (2013.01)

(52) U.S. Cl.
CPC ........... *H04N 1/444* (2013.01); *G06F 21/608* (2013.01)

(58) Field of Classification Search
CPC ... H04N 1/444; G06F 21/608; G06F 21/6209; G06K 17/00
See application file for complete search history.

(56) References Cited

U.S. PATENT DOCUMENTS 7,343,627 B2   3/2008   Gaebel et al.
8,102,557 B2   1/2012   Chou et al.
(Continued)

OTHER PUBLICATIONS

Anan et al. ~ "Watermarking Technologies for Security-Enhanced Printed Documents" ~ Fujitsu Sci Tech ~ Apr. 2007 ~ pp. 197-203.

*Primary Examiner* — Juan M Guillermety
(74) *Attorney, Agent, or Firm* — Brooks Cameron & Huebsch PLLC

(57) ABSTRACT

An imaging device comprises a scanning unit to create a scanned image of a document placed in the scanning unit. The imaging device comprises a remote scan management engine to create a remote scan request indicator in response to a remote access request received from a client device connected to the imaging device for remotely accessing the scanned image. The remote scan request indicator indicative of an authorization status of the remote access request. The authorization status being at least one of authorized, refused, and pending for authorization. The imaging device comprises a print engine to print a document copy having the scanned image and a remote scan request indicator. The remote scan request indicator is to allow an owner of the document to access the remote access authorization indicator to update the authorization status, to secure authorized access of the scanned image.

11 Claims, 6 Drawing Sheets

(56) References Cited

U.S. PATENT DOCUMENTS

| | | |
|---|---|---|
| 8,619,281 B2 | 12/2013 | Kakutani |
| 2003/0167336 A1 | 9/2003 | Iwamoto et al. |
| 2006/0072144 A1 | 4/2006 | Dowling et al. |
| 2006/0256392 A1 | 11/2006 | Van Hoof et al. |
| 2007/0139723 A1 | 6/2007 | Beadle et al. |
| 2010/0115589 A1* | 5/2010 | Tawada ................ G06F 21/608 726/4 |
| 2010/0149593 A1 | 6/2010 | Dowling et al. |
| 2016/0294832 A1 | 10/2016 | Pathak et al. |
| 2018/0082220 A1* | 3/2018 | Bombacino ............ G06Q 10/02 |

* cited by examiner

SECURING AUTHORIZED ACCESS OF A SCANNED IMAGE

BACKGROUND

Imaging devices are peripherals commonly used in home and office environments for obtaining copies of digital documents having print data, such as text or image. Imaging devices, such as multi-functional printers support multiple functions, such as printing, scanning of a document, photocopying of a document, and fax or email of a scanned document. Usually, the imaging devices may be accessed using a user device connected to the imaging device using wired connections for giving operational instructions and for receiving digital copies of documents. With advent in technology, remote client devices may also connect to imaging devices using wireless connections for giving operational instructions and for receiving digital copies of documents

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
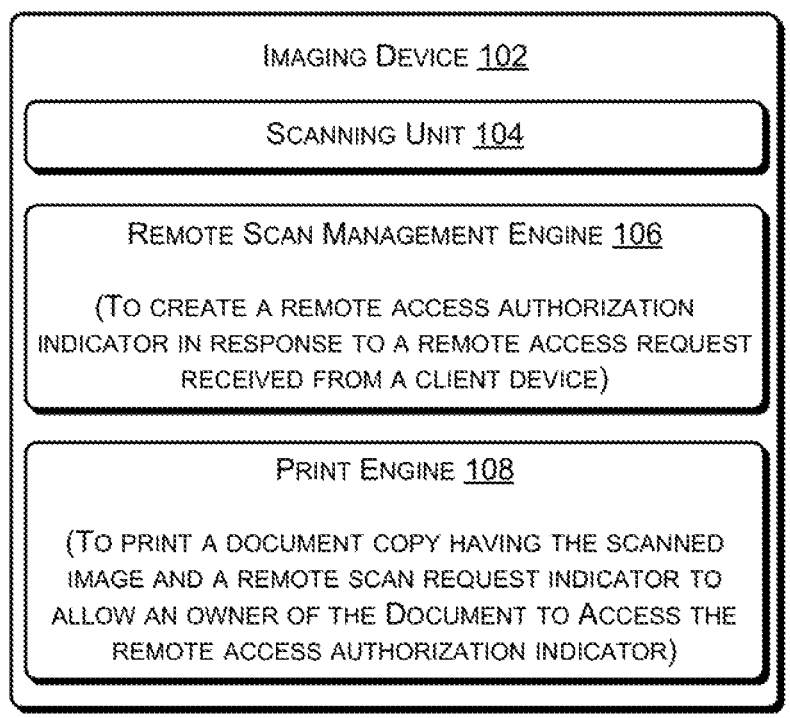
FIG. 1 illustrates an imaging device, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Imaging devices are commonly used for obtaining digital or printed copies of documents. Examples of the imaging devices include, but are not limited to, printing device, scanning devices, 3D printers, photocopy machines, and fax machines. The imaging devices may be used for performing one or more functions, such as printing, scanning of a document, photocopying of a document, and fax or email of a scanned document. Usually, in a photocopy operation, a physical copy of a printed document is placed on a scanner bed of a scanning unit of the imaging device. The printed document is initially scanned to generate a scanned image. The scanned image is then printed on a print media to obtain a document copy. The scanned image may also be electronically transmitted to a user device connected to the imaging device for various purposes, such as for editing before print, for storage, and for a print preview.

While the document is being scanned to create the document copy, the imaging device may allow client devices, remotely connected to the imaging device, to access the scanned image of the document. To ensure secure access of the scanned images, the imaging device allows registered client devices to access the scanned images. However, an operator of the imaging device may allow a remote client device to access the scanned images without informing an owner of the document being scanned, thereby allowing the client device to access data from the scanned images without the consent of the owner. For instance, when a user, i.e., the owner of the document, visits a print booth in a commercial establishment or in an office premises for getting a photocopy of a document having confidential data, the operator may have pre-registered and authorized client devices sniffing the scanned images from the imaging device, thereby causing breach of the confidential data. Thus, a user may be prone to data loss and fraud, whenever the user carries out a photocopy operation using an imaging device located in a public establishment.

The present subject matter discloses example implementations of an imaging device to facilitate authorized access of a scanned image. In one example implementation of the present subject matter, the imaging device is to receive remote access request from client devices for remotely accessing a scanned image of a document placed in a scanning unit of the imaging device. In response to the remote access request, the imaging device may generate a remote access authorization indicator indicative of an authorization status of the remote access request. The authorization status may be one of authorized, refused, and pending for authorization. The imaging device may then create a document copy having the scanned image and the remote scan request indicator indicating, to an owner of the document, that a client device tried to remotely access the scanned image. The remote scan request indicator may be a weblink, a quick response (OR) code, a barcode, etc. connected to the remote access authorization indicator. The owner may then use the remote scan request indicator to access the remote access authorization indicator to update the authorization status, indicating whether or not the client device is allowed to access the scanned image, thereby securing authorized access of the scanned image.

In one example implementation of the present subject matter, to obtain a copy of a document, the owner of the document may place the document in a scanning unit of the imaging device. The scanning unit may then create the scanned image of the document. While the scanned image is being created, the imaging device may receive the remote access request from the client device remotely connected to the imaging device. In response, the imaging device may obtain device credentials corresponding to the client device and may update the remote access authorization indicator having a list of client devices requesting the remote access of the scanned image and the authorization status for each of the client devices. Further, the imaging device may generate the remote scan request indicator linked to the remote access authorization indicator.

The imaging device may subsequently generate the document copy having the scanned image and the remote scan request indicator indicating the receipt of remote access requests. The owner of the document may then access the remote access authorization indicator by accessing the remote scan request indicator using a user device connected to the imaging device, to view and update the authorization status of each remote access request. Subsequently, in response to a user authorization input from the owner, the imaging device updates the authorization status to one of authorized and refused. If the updated authorization status is authorized, a scanned image access link is transmitted to the client device. However, if the updated authorization status is refused, the remote access request of the client device is rejected. Further, a clean updated document having the scanned image without the remote scan request indicator is provided to the owner of the document.

The present subject matter thus facilitates in ensuring authorized access of a scanned image by a client device. Having the remote scan request indicator printed along with the scanned image on the document copy facilitates in notifying the owner that attempts to remotely access the scanned image have been made by client devices. Further, linking the remote scan request indicator with the remote access authorization indicator helps the user in accessing device credentials about the client devices and their authorization status. The owner of the document may then authorize or refuse access to the client devices, thus providing total control to the owner of the document for authorizing access to the scanned image. Thus, providing a reliable and secure way to secure a scanned document without making any significant changes in the current systems.

Further, in case any remote access request is maliciously approved by an operator of the imaging device, the status of the remote access request in the remote access authorization indicator may be updated to authorized. The owner, on accessing the remote scan request indicator may thus get details of such malicious attempts by an operator of the imaging device. The owner of the document will thus be informed that the scanned image of document was accessed without his consent. The owner in such a case may take further suitable actions to secure the document and obtain the scanned images from the operator. Further, a clean copy of the document is available only if there are no remote access request pending for authorization. As a result, the operator might have to disable remote scan operations to carry out a clean scan. Thus, chances of fraudulence are further reduced.

The present subject matter is further described with reference to FIGS. 1 to 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates an imaging device 102, according to an example implementation of the present subject matter. Examples of the imaging device 102 include, but are not limited to, a multifunction printer, a home printer, an office printer, a 3D printer, a scanner, and a photocopy device. In one example, the imaging device 102 may support at least scanning of a document, and printing or electronic transmittal of a document copy obtained upon scanning of the document.

In one implementation, the imaging device 102 includes a scanning unit 104 to create a scanned image of a document placed in the scanning unit 104. In one example, the document may be placed in a scanning tray of the scanning unit 104. The imaging device 102 further includes a remote scan management engine 106 to create a remote scan request indicator in response to a remote access request. The remote access request may be received from a client device (not shown in this figure) connected to the imaging device 102 for remotely accessing the scanned image. In one example, the remote scan request indicator may be indicative of an authorization status of the remote access request. In one example, the authorization status is at least one of authorized, refused, and pending for authorization.

The imaging device 102 further includes a print engine 108 to print a document copy having the scanned image and a remote scan request indicator. wherein, to secure authorized access of the scanned image. In one example, the remote scan request indicator is to allow an owner of the document to access the remote access authorization indicator to update the authorization status, to secure authorized access of the scanned image. The owner of the document may be a user, such as a creator and a possessor of the document, getting the document copied using the imaging device 102.

Figure 2:
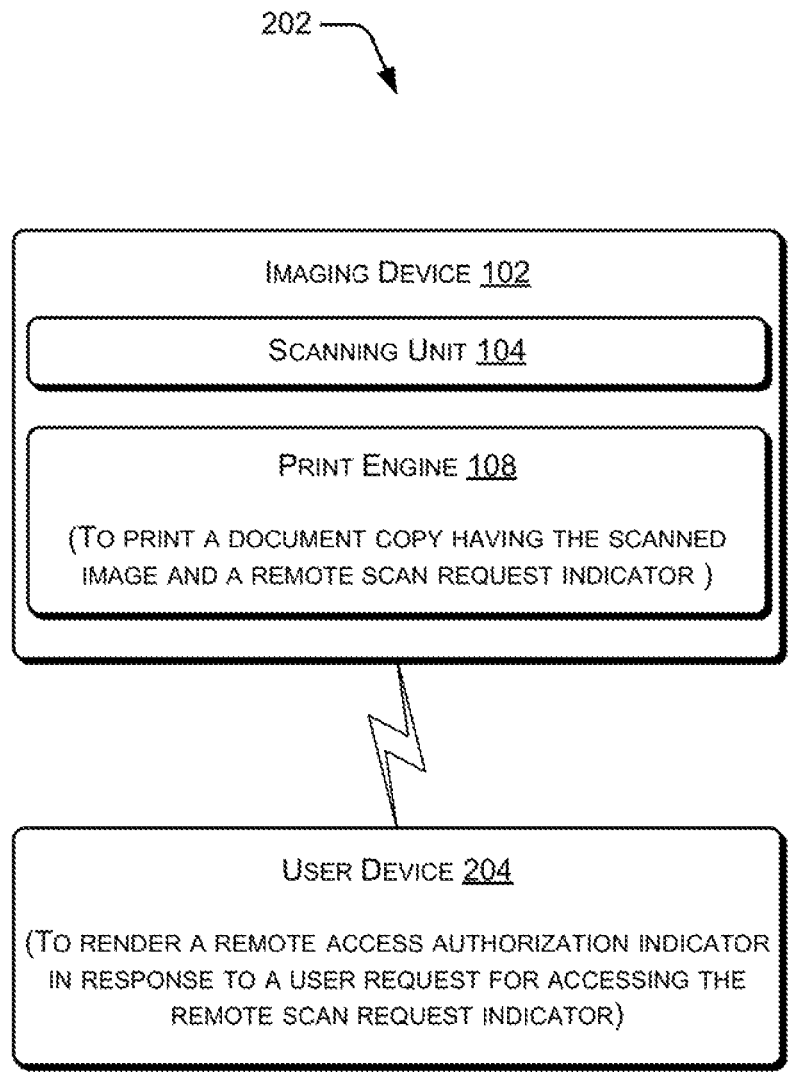
FIG. 2 illustrates an imaging system, according to an example implementation of the present subject matter.

FIG. 2 illustrates an imaging system 202, according to an example implementation of the present subject matter. The imaging system 202 includes an imaging device, such as the imaging device 102 and a user device 204 communicatively coupled to the imaging device 102. An example of the user device 204 includes, but is not limited to, desktop computers, laptops, tablets, portable computers, workstation, mainframe computer, servers, and network servers.

In one example, the imaging device 102 includes the scanning unit 104 to create the scanned image of the document placed in the scanning unit 104. The imaging device 102 further includes the print engine 108 to provide a document copy having the scanned image and the remote scan request indicator. In one example, the remote scan request indicator may indicate receipt of a remote access request from a client device for remotely accessing the scanned image.

The user device 204 may render a remote access authorization indicator in response to a user request for accessing the remote scan request indicator. The remote access authorization indicator includes a list of client devices requesting a remote access of the scanned image, device credentials of the client devices, and the authorization status of the client devices. The authorization status may be at least one of authorized, refused, and pending for authorization. The user device 204 may further provide, to the imaging device 102, a user authorization input indicating an updated authorization status for updating the authorization status, to secure authorized access of the scanned image. In one example, the updated authorization status is one of authorized and refused.

Figure 3:
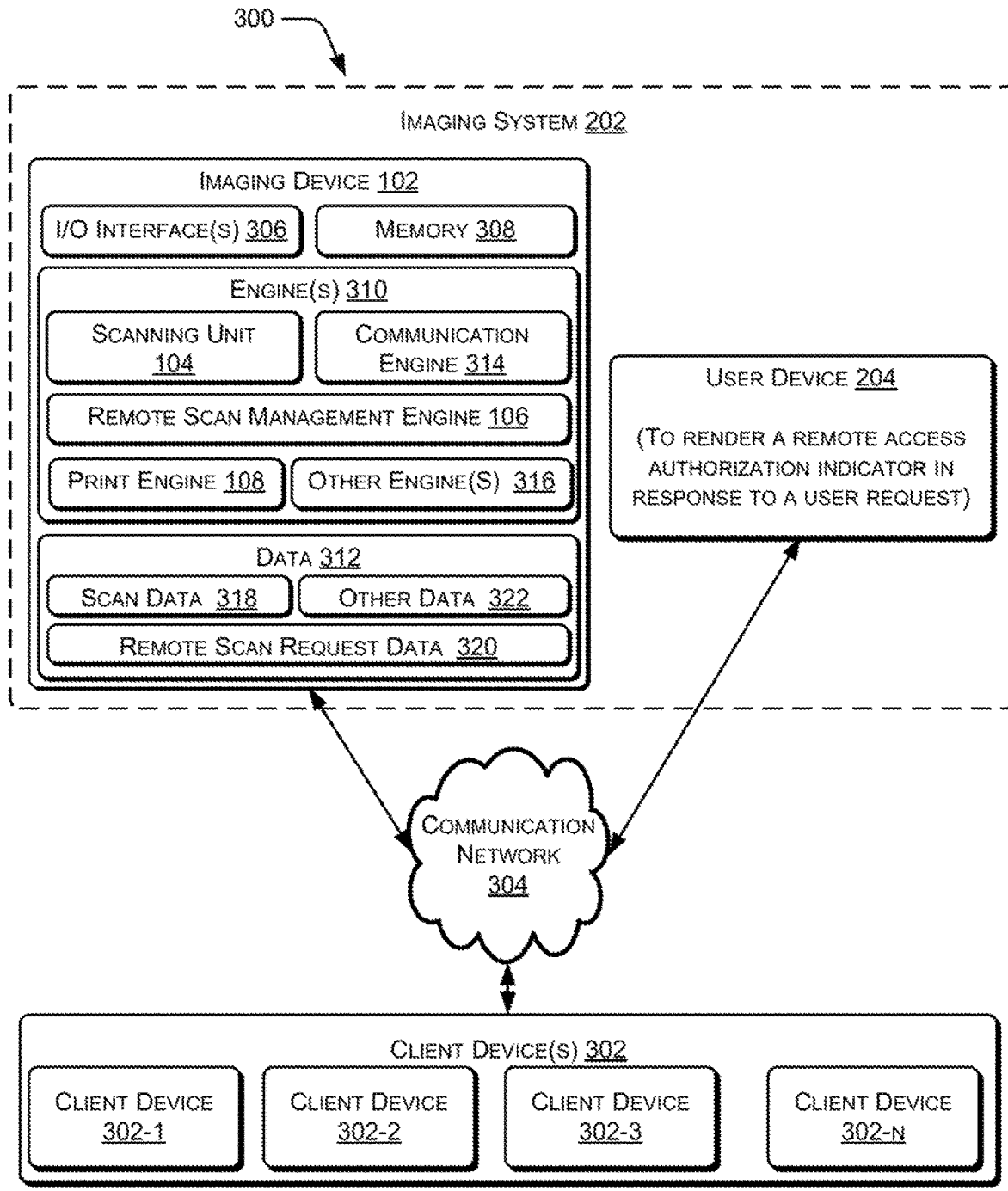
FIG. 3 illustrates a computing environment having an imaging system, according to another example implementation of the present subject matter.

FIG. 3 illustrates a computing environment 300 having the imaging system 202, according to an example implementation of the present subject matter. The computing environment 300 includes the imaging device 102, the user device 204, and client devices 302-1, 302-2, 302-3, and 302-n. The client devices 302-1, 302-2, 302-3, and 302-n are hereinafter collectively referred to as client devices 302 and individually referred to as client device 302. Example of the user device(s) 204 and the client devices 302 includes, but is not limited to, desktop computers, laptops, tablets, portable computers, workstation, mainframe computer, servers, and network servers. The present approaches may also be implemented in other types of user device 204 and client devices 302 without deviating from the scope of the present subject matter. Examples of the imaging device 102 include, but are not limited to, a multifunction printer, a home printer, an office printer, a 3D printer, a scanner, and a photocopy device.

The user devices 204, the client device 302, and the imaging device 102 may be connected with each other over a communication network 304. In one example, the user device 204 may be used by a user, such as an operator of the imaging device 102 or the owner of the document for operating the imaging device 102 for obtaining the document copy. For example, the user may provide scan instructions to the imaging device 102 using the user devices 204. Further, a remote user may provide remote access request to the imaging device 102 using the client device 302.

The communication network 304 may be a wireless network, a wired network, or a combination thereof. The communication network 304 can also be an individual network or a collection of many such individual networks, interconnected with each other and functioning as a single large network, e.g., the Internet or an intranet. The communication network 304 can be one of the different types of networks, such as intranet, local area network (LAN), wide area network (WAN), and the internet. In an example, the communication network 304 may include any communication network that use any of the commonly used protocols, for example, Hypertext Transfer Protocol (HTTP), and Transmission Control Protocol/Internet Protocol (TCP/IP).

The imaging device 102 includes input/output (I/O) interface(s) 306 and memory 308. The I/O interface(s) 306 may include a variety of interfaces, for example, interfaces for data input and output devices, referred to as I/O devices, storage devices, network devices, and the like. The I/O interface(s) 306 may facilitate communication between the imaging device 102, the user device 204, the client device(s) 302, and various other computing devices connected in a networked environment. The I/O interface(s) 306 may also provide a communication pathway for one or more components of the imaging device 102. Examples of such components include, but are not limited to, input device, such as keyboards and a touch enabled graphical user interface.

The memory 308 may store one or more computer-readable instructions, which may be fetched and executed to provide print interfaces to users for providing print instructions. The memory 308 may include any non-transitory computer-readable medium including, for example, volatile memory such as RAM, or non-volatile memory such as EPROM, flash memory, and the like. The imaging device 102 further includes engine(s) 310 and data 312.

The engine(s) 310 may be implemented as a combination of hardware and programming (for example, programmable instructions) to implement one or more functionalities of the engine(s) 310. In examples described herein, such combinations of hardware and programming may be implemented in several different ways. For example, the programming for the engine(s) 310 may be processor executable instructions stored on a non-transitory machine-readable storage medium and the hardware for the engine(s) 310 may include a processing resource (for example, one or more processors), to execute such instructions. In the present examples, the machine-readable storage medium may store instructions that, when executed by the processing resource, implement engine(s) 310. In such examples, the imaging device 102 may include the machine-readable storage medium storing the instructions and the processing resource to execute the instructions, or the machine-readable storage medium may be separate but accessible to the imaging device 102 and the processing resource. In other examples, engine(s) 310 may be implemented by electronic circuitry. The engine(s) 310 may further include circuitry and hardware for performing print and scan operations.

The data 312 includes data that is either stored or generated as a result of functionalities implemented by any of the engine(s) 310. The engine(s) 310 of the imaging device 102 include the scanning unit 104, the remote scan management engine 106, the print engine 108, a communication engine 314, and other engine(s) 316. The other engine(s) 316 may implement functionalities that supplement applications or functions performed by the engine(s) 310. Further, the data 312 may include scan data 318, remote scan request data 320, and other data 322.

As previously discussed, the imaging device 102 may support at least scanning of a document, and printing or electronic transmittal of a document copy obtained upon scanning of the document. In one example, the imaging device 102 may be located in a secure home or office environment and be self-operated by an owner of the document. The owner of the document may be a user, such as a creator and a possessor of the document, getting the document copied using the imaging device 102. In another example, the imaging device 102 may be located in a public establishment and be operated by a user other than the owner of the document, for example, by an operator.

In operation, to obtain either a digital or a physical copy of a document, the document may be placed in the scanning unit 104. In one example, the document may be placed in a scanning tray (not shown in the figure) of the scanning unit 104 either by the owner of the document or the operator. The scanning unit 104 may scan the document and create the scanned image of the document. The scanned image thus obtained is a digital copy of the document and maybe saved in the scan data 318 for further processing, such as for electronic transmittal to the user device or for being print on a print medium by the print engine 108.

As the scanning unit 104 is performing scan operation to create and save the scanned image, a remote user may communicate with the imaging device 102 through the client device 302, say, the client device 302-1. The client device 302 may send the remote access request to the imaging device 102 for accessing the scanned image saved on the scan data 318. The communication engine 314 may receive the remote access request and save the same in the remote scan request data 320. The remote scan management engine 106 may subsequently obtain the remote access request for further processing.

In one example, the remote scan management engine 106 may initially obtain device credentials of the client device 302 sending the remote access request. The device credentials may include an IP address of the client device, device hostname, device make, and device model. In one example, the remote scan management engine 106 may obtain the IP address of the client device 302 from the communication engine 314. Further, the remote scan management engine 106 may obtain the device hostname using Domain Name System (DNS) pointer (PTR) records. The remote scan management engine 106 may further obtain the device make and the device model using a Dynamic Host Configuration Protocol (DHCP) option 77. The remote scan management engine 106 may further update the remote access authorization indicator having a list of client devices requesting the remote access of the scanned image, the device credentials of the client devices, and the authorization status of the client devices.

In case no remote access authorization indicator exists, the remote scan management engine 106 may create a remote access authorization indicator and save the remote access authorization indicator in the remote scan request data 320. In one example, the remote access authorization indicator may be in a tabular format. An exemplary remote access authorization indicator in an initial form, as generated by the remote scan management engine 106 is illustrated below, as Table 1

TABLE 1

| IP address | Device hostname | Device make | Device model | Authorization status |
|---|---|---|---|---|
| 15.77.17.95 | ABC | XY | XY-001 | Pending |
| 10.74.37.85 | EFG | ZX | ZX-001 | Pending |
| 15.87.10.10 | HIJ | XY | XY-009 | Authorized-web scan done |

The Table 1 illustrates a list of three client devices requesting the remote access of the scanned image, the device credentials of each of the client devices, and the authorization status of each request.

Further, the remote scan management engine 106 may generate the remote scan request indicator linked to the remote access authorization indicator. Subsequently, the print engine 108 may create the document copy having the scanned image and the remote scan request indicator. The remote scan request indicator is a hyperlink connected to the remote access authorization indicator, allowing a user to access the remote access authorization indicator. Examples of the hyperlink include, but are not limited to, a weblink, a QR code, a barcode, a uniform resource locator (URL), a uniform resource identifier (URI), and similar codes.

Figure 4:
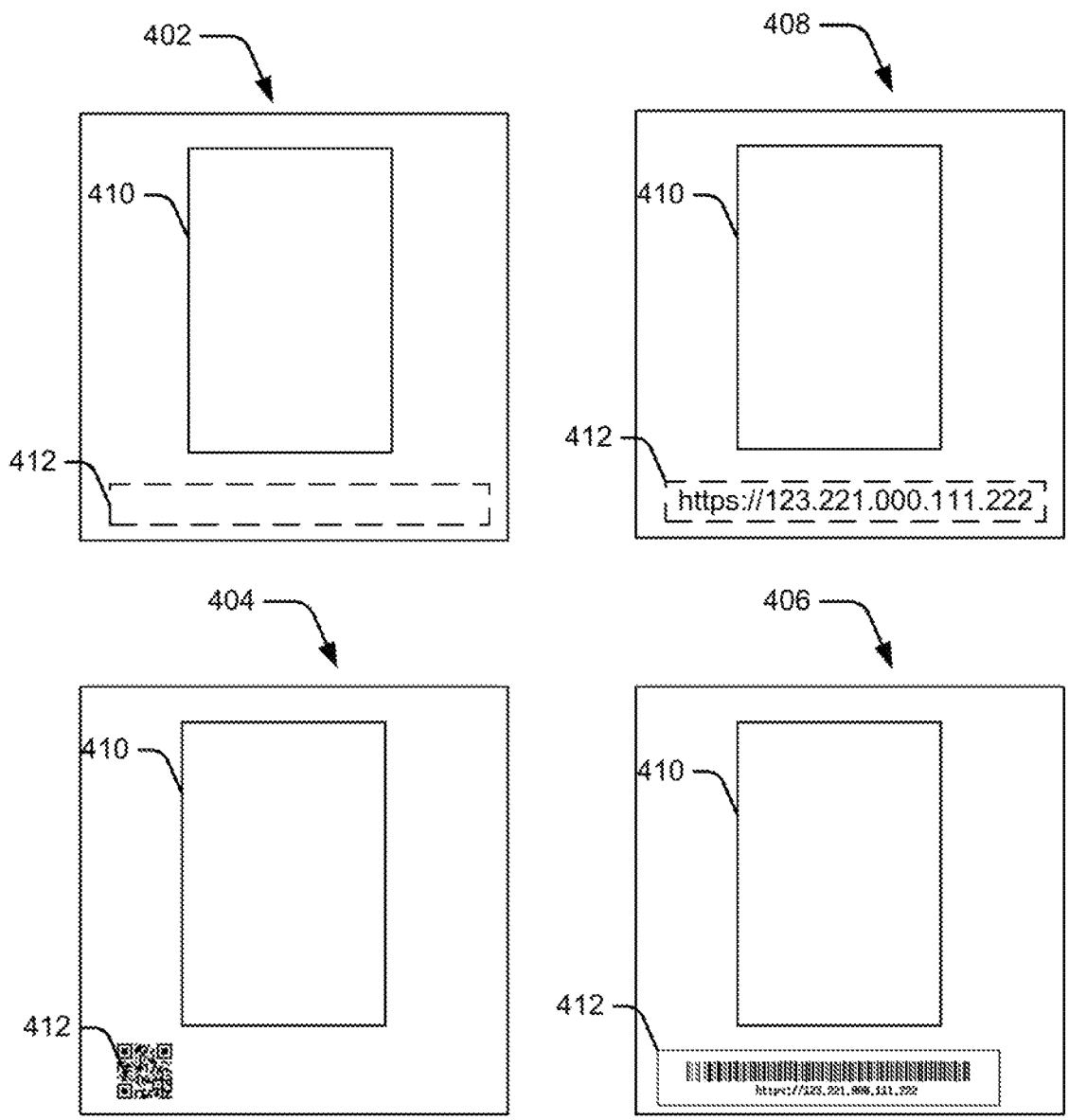
FIG. 4 illustrates exemplary document copies having a scanned image and a remote scan request indicator, according to an example implementation of the present subject matter.

In one example, the remote scan request indicator may be provided at a bottom of the document copy, below the scanned image such that the remote scan request indicator is visible to the owner of the document. In another example, the remote scan request indicator may be provided at a top of the document copy, above the scanned image. In yet another example, positioning of the remote scan request indicator and the scanned image in the document copy may be customized, for example, by print engine 108. Examples of the document copy are illustrated in FIG. 4. FIG. 4 illustrates exemplary document copies 402, 404, 406, and 408 having a scanned image 410 and a remote scan request indicator 412. The document copy 402 illustrates exemplary placement of the scanned image 410 and the remote scan request indicator 412. The document copy 404 illustrates the scanned image 410 and a QR code as the remote scan request indicator 412. The document copy 406 illustrates the scanned image 410 and a barcode as the remote scan request indicator 412. The document copy 408 illustrates the scanned image 410 and a weblink as the remote scan request indicator 412.

The print engine 108 may subsequently provide the document copy to the owner. In one example, the print engine 108 may print the document copy having the scanned image and the remote scan request indicator, in response to a photocopy print request from the user device 204. To print the document copy, the print engine 108 may share the document copy with a print unit (not shown in the figure) of the imaging device 102.

In another example, the print engine 108 may perform an electronic transfer of the document copy to the owner of the document, in response to an electronic transfer request for a copy of the document from the user device 204. The print engine 108 may perform the electronic transfer of the document copy using the communication engine 314 and the I/O interface(s) 306. The electronic transfer may include, for example, a wired or a wireless transfer of the document copy using file sharing platforms, such as email, direct transfer, near field communication. The electronic transfer may further include storing the document copy in a local storage associated with the user device 204 using the communication network 304. The electronic transfer may further include sending the document copy to a mail ID of the owner of the document.

On receiving the document copy, the owner may look at the remote scan request indicator and realize that an attempt to remotely access the scanned image has been made by the client device(s) 302. To obtain the information about the client device(s) 302 attempting to access the scanned image, the owner may provide a user request for accessing the remote access authorization indicator using the remote scan request indicator.

In one example, the owner or the operator may make the user request by typing the weblink, mentioned on the document copy, in an interface on the user device 204. In another example, the owner or the operator may use a QR scanner or a barcode scanner attached to the user device 204 to read the remote scan request indicator and send the user request to the user device 204. Once the remote scan request indicator is read by the user device 204, the user device 204 may send a request for accessing the remote access authorization indicator to the imaging device 102.

In response, the remote scan management engine 106 may share the remote access authorization indicator with the user device 204. In one example, the user device 204 may render the remote access authorization indicator on a display screen of the user device 204 for the owner. The owner may subsequently read the remote access authorization indicator to ascertain the details of the client device(s) 302 attempting to access the scanned image. The owner may further check the authorization status of each remote access request to ascertain whether any client device 302 has already accessed the scanned image, for example, based on a pre-authorization by the operator or using a malware on the user device 204. In case the authorization status of any client device 302, say, the client device with the device hostname as "HIJ" is authorized, the owner may deduce that the client device 302 has already accessed the scanned image. The owner may thus take further preventive or punitive actions, such as report such a breach of confidentiality to the operator or to regulatory authorities. In case the owner was using an imaging device in a home or office, the owner may update security systems for user device 204 and the imaging device 102.

In case the authorization status is pending, the owner may verify the credibility of the client device 302 and choose to either authorize or reject the remote access request from the client device 302. The user device 204 may subsequently share a user authorization input with the remote scan management engine 106, indicating an updated authorization status for the remote access request. In one example, the updated authorization status is one of authorized and refused. The remote scan management engine 106 may then update the authorization status of each remote access request in the remote access authorization indicator.

Further, the communication engine 314 may access the remote access authorization indicator to identify the client devices 302 that have been authorized to access the scanned image. If the updated authorization status is authorized, the communication engine 314 may transmit a scanned image access link to the client device 302. If the updated authorization status is refused, the communication engine 314 may reject the remote access request of the client device 302. In one example, communication engine 314 may send a communication indicating the rejection of the remote access request to the client device 302.

Further, the remote scan management engine 106 may update the remote access authorization indicator to remove all remote access requests having the authorization status as one of authorized and refused. The remote scan management engine 106 may further determine if a clean scan request is received from the owner of the document. If the clean scan request is received, the remote scan management engine 106 may ascertain if the remote access authorization indicator has any remote access request pending for authorization. If the remote access authorization indicator has no remote access request pending for authorization, the remote scan management engine 106 may provide an updated document copy having the scanned image. In one example, the remote scan management engine 106 may instruct the print engine 108 to print the updated document copy having the scanned image. In another example, the remote scan management engine 106 may instruct the print engine 108 to electronically transfer the updated document copy having the scanned image.

If the remote access authorization indicator has a remote access request pending for authorization, for instance, a remote access request may be received after the remote access authorization indicator was updated or the owner may have missed giving inputs for one remote access request in the user authorization input. The remote scan management engine 106 may print the scan document with the remote scan request indicator. The process as discussed above may then be repeated till no remote access request is pending for authorization.

Figure 5:
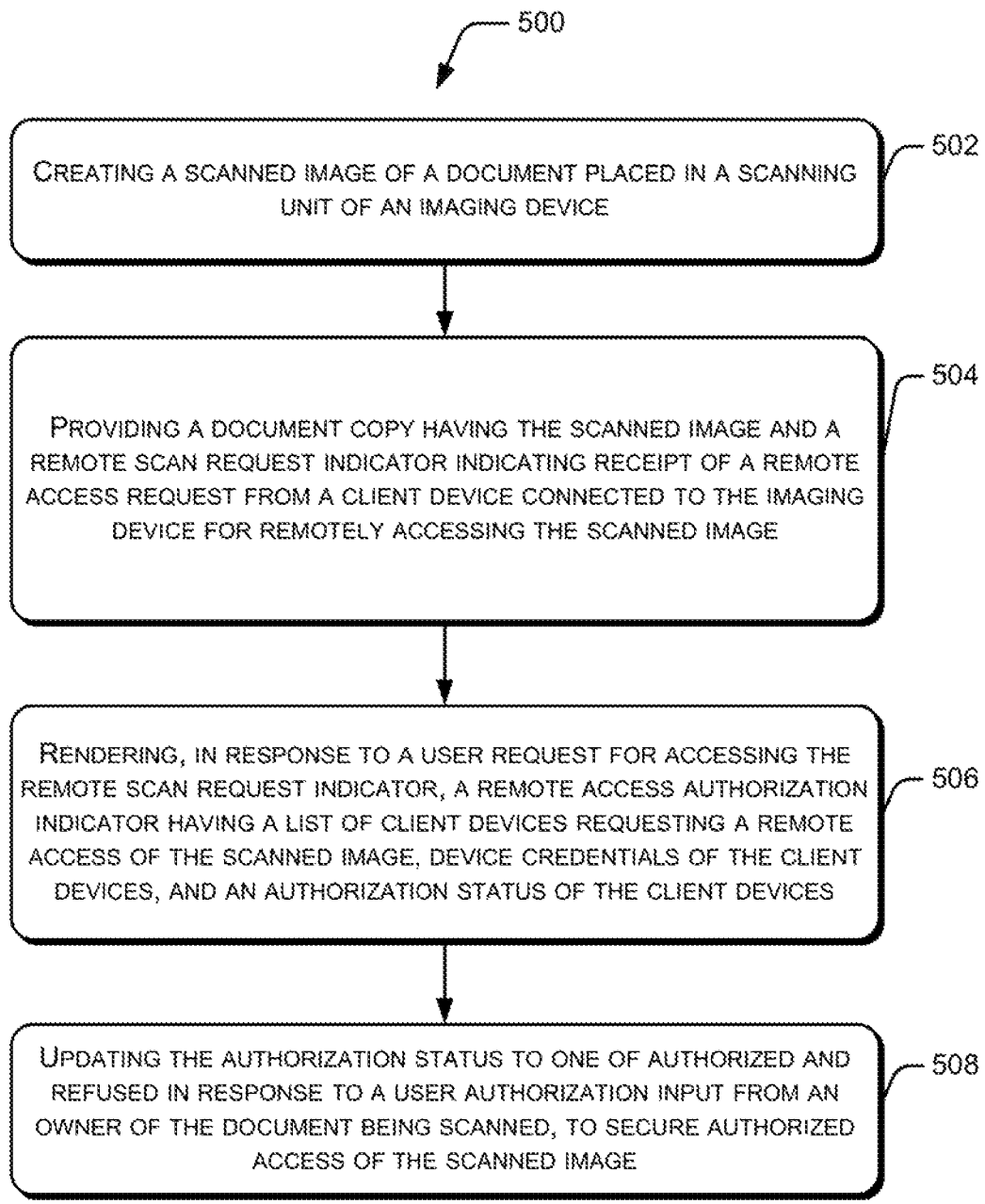
FIG. 5 illustrates a method for securing authorized access of a scanned image, according to an example implementation of the present subject matter.
Figure 6:
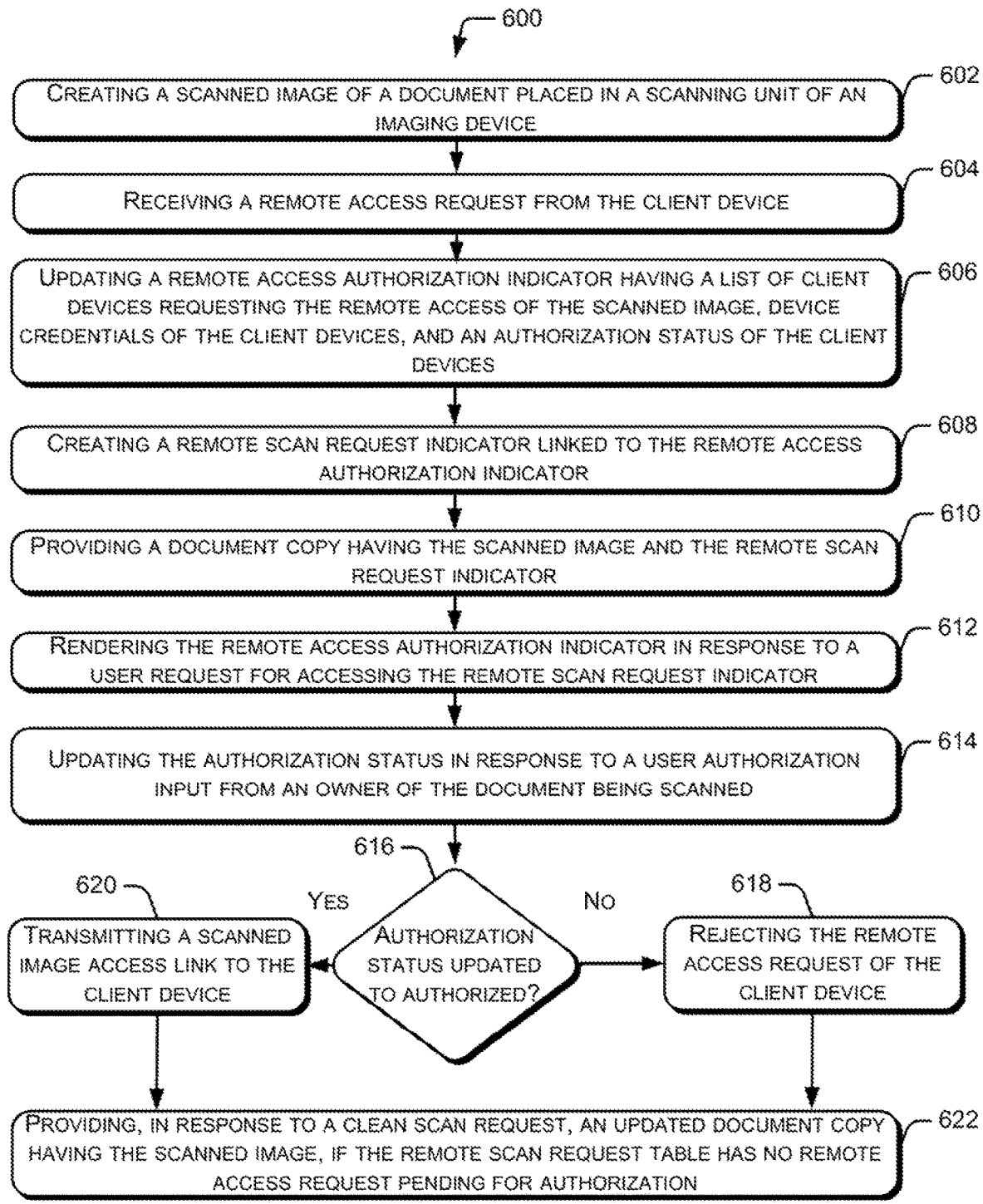
FIG. 6 illustrates a method for secure scan of a document, according to an example implementation of the present subject matter.

FIGS. 5-6 illustrate example methods 500 and 600, respectively, for securing authorized access of a scanned image. The order in which the methods are described is not intended to be construed as a limitation, and any number of the described method blocks may be combined in any order to implement the methods, or an alternative method. Furthermore, methods 500 and 600 may be implemented by processing resource or computing device(s) through any suitable hardware, non-transitory machine readable instructions, or combination thereof.

It may also be understood that methods 500 and 600 may be performed by programmed computing devices, such as user device 204 and imaging device 102, as depicted in FIGS. 1-3. Furthermore, the methods 500 and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 500 and 600 are described below with reference to the user device 204 and the imaging device 102 as described above; other suitable systems for the execution of these methods may also be utilized. Additionally, implementation of these methods is not limited to such examples.

FIG. 5 illustrates the method 500 for securing authorized access of a scanned image, according to an example implementation of the present subject matter. At block 502, a scanned image is created for a document placed in a scanning unit of an imaging device. In one example, the scanned image is created based on a scan or a copy request received from a user device, for instance, the user device 204 connected to the imaging device, for instance, the imaging device 102.

At block 504, a document copy having the scanned image and a remote scan request indicator is provided. The remote scan request indicator may indicate receipt of a remote access request from a client device connected to the imaging device for remotely accessing the scanned image. In one example, the document copy is provided to an owner of the document by electronically transferring the document copy. In another example, the document copy is provided to the owner of the document by printing the document copy on a print medium.

At block 506, a remote access authorization indicator is rendered in response to a user request for accessing the remote scan request indicator. In one example, the remote access authorization indicator includes a list of client devices requesting a remote access of the scanned image, device credentials of the client devices, and an authorization status of the client devices. The authorization status may be one of authorized, refused, and pending for authorization.

At block 508, the authorization status is updated to one of authorized and refused in response to a user authorization input from the owner of the document being scanned, to secure authorized access of the scanned image. In one example, the imaging device 102 may update the authorization status based on the user authorization input received from the owner, through the user device 204.

FIG. 6 illustrates a method for secure scan of a document, according to an example implementation of the present subject matter. At block 602, a scanned image is created for a document placed in a scanning unit of an imaging device.

At block 604, a remote access request is received. In one example, the remote access request is received from a client device, such as the client device 302 remotely connected to the imaging device 102. The remote access request may be received from the client device for accessing the scanned image.

At block 606, a remote access authorization indicator having a list of client devices requesting the remote access of the scanned image is updated. In one example, the remote access authorization indicator may include a list of the client devices, device credentials of the client devices, and an authorization status of the client devices. The device credentials may include at least one of IP address of the client device, device hostname, device make, and device model. Further, the authorization status is at least one of authorized, refused, and pending for authorization. In one example, the device credentials may be obtained by a remote scan management engine, such as the remote scan management engine 106 of the imaging device on receiving the remote access request.

At block 608, a remote scan request indicator is created. In one example, the remote scan request indicator is linked to the remote access authorization indicator.

At block 610, a document copy having the scanned image and the remote scan request indicator is provided. In one example, the document copy is provided to an owner of the document using techniques of electronic transfer. In another example, the document copy is provided to the owner of the document in a printed form.

At block 612, the remote access authorization indicator is rendered. In one example, the remote access authorization indicator is rendered in response to a user request for accessing the remote scan request indicator received from the owner of the document, using the user device 204.

At block 614, the authorization status is updated in response to a user authorization input received from the owner of the document being scanned, to secure authorized access of the scanned image. In one example, the authorization status is updated to one of authorized and refused.

At block 616, it is determined whether the authorization status is updated to authorized. If in case it is determined that the authorization status is not updated to authorized, ('No' path from block 616), the remote access request of the client device is rejected at block 618.

In case it is determined that the authorization status is updated to authorized, ('Yes' path from block 616), a scanned image access link is transmitted to the client device at block 620.

At block 622, an updated document copy is provided in response to a clean scan request. In one example, the updated document copy is provided if the remote access authorization indicator has no remote access request pending for authorization. Further, the updated document copy includes the scanned image without the remote scan request indicator.

Although examples for the present subject matter have been described in language specific to structural features and/or methods, it should be understood that the appended claims are not limited to the specific features or methods described. Rather, the specific features and methods are disclosed and explained as examples of the present subject matter.

What is claimed is:

1. An imaging device comprising:
    a scanning unit to create a scanned image of a document placed in the scanning unit;
    a remote scan management engine to create a remote access authorization indicator in response to a remote access request received from a client device connected to the imaging device for remotely accessing the scanned image, wherein the remote access authorization indicator is indicative of an authorization status of the remote access request, and wherein the authorization status is at least one of authorized, refused, and pending for authorization; and
    a print engine to print a document copy having the scanned image and a remote scan request indicator printed on the document copy, wherein the remote scan request indicator is to allow an owner of the document to access the remote access authorization indicator printed on the document copy to update the authorization status, to secure authorized access of the scanned image; wherein the remote scan management engine is further to:
        provide, to the imaging device, a user authorization input indicating an updated authorization status for updating the authorization status, to secure authorized access of the scanned image, wherein the updated authorization status is one of authorized and refused;
        update the remote access authorization indicator to remove the remote access request having the authorization status as one of authorized and refused;
        determine if a clean scan request is received from the owner of the document;
        ascertain if the remote access authorization indicator has any remote access request pending for authorization; and
        provide an updated document copy having the scanned image, if the remote access authorization indicator has no remote access request pending for authorization.

2. The imaging device as claimed in claim 1, wherein the remote scan management engine further is to:
    obtain device credentials of the client device, in response to the remote access request from the client device, the device credentials including at least one of IP address of the client device, device hostname, device make, and device model; and
    generate the remote scan request indicator, connected to the remote access authorization indicator having a list of client devices requesting the remote access of the scanned image, the device credentials of the client devices, and the authorization status of the client devices.

3. The imaging device as claimed in claim 1, further comprising a communication engine to:
    receive the remote access request from the client device;
    transmit a scanned image access link to the client device, if the updated authorization status is authorized; and
    reject the remote access request of the client device, if the updated authorization status is refused.

4. A method for securing authorized access of a scanned image, the method comprising:
    creating a scanned image of a document placed in a scanning unit of an imaging device;
    providing a document copy having the scanned image and a remote scan request indicator indicating receipt of a remote access request from a client device connected to the imaging device for remotely accessing the scanned image;
    rendering, in response to a user request for accessing the remote scan request indicator, a remote access authorization indicator having a list of client devices requesting a remote access of the scanned image, device credentials of the client devices, and an authorization status of the client devices, wherein the authorization status is one of authorized, refused, and pending for authorization;
    updating the authorization status to one of authorized and refused in response to a user authorization input from an owner of the document being scanned, to secure authorized access of the scanned image; and
    updating the remote access authorization indicator to remove the remote access request having the authorization status as one of authorized and refused;
    determining if a clean scan request is received from the owner of the document;
    ascertaining if the remote access authorization indicator has any remote access request pending for authorization; and
    providing an updated document copy having the scanned image, if the remote access authorization indicator has no remote access request pending for authorization.

5. The method as claimed in claim 4, wherein providing the document copy further comprises:
    receiving the remote access request from the client device;
    obtaining device credentials of the client device, the device credentials including at least one of IP address of the client device, device hostname, device make, and device model;
    updating the remote access authorization indicator; and
    creating the remote scan request indicator linked to the remote access authorization indicator.

6. The method as claimed in claim 4, wherein providing the document copy further comprises at least one of:
    printing the document copy having the scanned image and the remote scan request indicator; and
    transmitting using electronic transfer, the document copy to the owner of the document.

7. The method as claimed in claim 4, further comprising:
transmitting a scanned image access link to the client device, if an updated authorization status is authorized; and
rejecting the remote access request of the client device, if the updated authorization status is refused.

8. An imaging system comprising:
an imaging device comprising:
   a scanning unit to create a scanned image of a document placed in the scanning unit; and
   a print engine to provide a document copy having the scanned image and a remote scan request indicator indicating receipt of a remote access request from a client device, for remotely accessing the scanned image;
a user device connected to the imaging device to:
   render a remote access authorization indicator in response to a user request for accessing the remote scan request indicator, wherein the remote access authorization indicator includes a list of client devices requesting a remote access of the scanned image, device credentials of the client devices, and an authorization status of the client devices wherein the authorization status is at least one of authorized, refused, and pending for authorization;
   provide, to the imaging device, a user authorization input indicating an updated authorization status for updating the authorization status, to secure authorized access of the scanned image, wherein the updated authorization status is one of authorized and refused update the remote access authorization indicator to remove the remote access request having the authorization status as one of authorized and refused;
   determine if a clean scan request is received from the owner of the document;
   ascertain if the remote access authorization indicator has any remote access request pending for authorization; and
   provide updated document copy having the scanned image, if the remote access authorization indicator has no remote access request pending for authorization.

9. The imaging system as claimed in claim 8, wherein the imaging device further comprising a remote scan management engine to:
receive the remote access request received from the client device remotely connected to the imaging device;
obtain device credentials of the client device, the device credentials including at least one of IP address of the client device, device hostname, device make, and device model;
create the remote access authorization indicator; and
create the remote scan request indicator, wherein the remote scan request indicator is linked to the remote access authorization indicator.

10. The imaging system as claimed in claim 8, wherein the print engine further is to:
print the document copy having the scanned image and the remote scan request indicator, in response to a photocopy print request; and
perform an electronic transfer of the document copy to an owner of the document, in response to an electronic transfer request for a copy of the document.

11. The imaging system as claimed in claim 8, wherein the imaging device further comprising a communication engine to:
receive the remote access request from the client device;
transmit a scanned image access link to the client device, if the updated authorization status is authorized; and
reject the remote access request of the client device, if the updated authorization status is refused.

\* \* \* \* \*